(12) United States Patent
Chen et al.

(10) Patent No.: US 11,498,110 B2
(45) Date of Patent: Nov. 15, 2022

(54) FINE BLANKING METHOD AND DEVICE FOR FORMING FRICTION PLATES WITH FRICTION MATERIAL LAYERS

(71) Applicants: Southwest Technology and Engineering Research Institute, Chongqing (CN); Harbin Institute of Technology at Weihai, Shandong (CN)

(72) Inventors: Qiang Chen, Chongqing (CN); Gang Chen, Shandong (CN); Xusheng Chang, Shandong (CN); Hongming Zhang, Shandong (CN); Dayu Shu, Chongqing (CN); Hong Zhan, Chongqing (CN); Lin Xiang, Chongqing (CN); Yunliang Xiang, Chongqing (CN); Yan Tang, Chongqing (CN)

(73) Assignees: Southwest Technology and Engineering Research Institute, Chongqing (CN); Harbin Institute of Technology at Weihai, Weihai (CN)

( * ) Notice: Subject to any disclaimer, the term of this patent is extended or adjusted under 35 U.S.C. 154(b) by 0 days.

(21) Appl. No.: 16/988,704

(22) Filed: Aug. 9, 2020

(65) Prior Publication Data

US 2021/0316354 A1 Oct. 14, 2021

(30) Foreign Application Priority Data

Apr. 10, 2020 (CN) .......................... 202010281386.3

(51) Int. Cl.
*B21D 28/16* (2006.01)
*B22F 3/03* (2006.01)

(52) U.S. Cl.
CPC ................ *B21D 28/16* (2013.01); *B22F 3/03* (2013.01)

(58) Field of Classification Search
CPC ........ B21D 28/02; B21D 28/16; B21D 22/10; B21D 22/02; B21D 22/20; B21D 24/04;
(Continued)

(56) References Cited

U.S. PATENT DOCUMENTS

| 2,796,253 | A | * | 6/1957 | Schulze | ................. | B21D 22/10 |
| | | | | | | 267/119 |
| 3,570,343 | A | * | 3/1971 | Wolnosky | .............. | B21D 28/16 |
| | | | | | | 83/639.1 |

(Continued)

FOREIGN PATENT DOCUMENTS

CN 102189263 A 9/2011

*Primary Examiner* — Adam J Eiseman
*Assistant Examiner* — Fred C Hammers

(57) ABSTRACT

A fine blanking device and method for forming a friction plate with friction material layers. The fine blanking device includes an upper die, a lower die, a guide mechanism, a punch and a counter punch. Upper and lower blank holders are respectively provided at outer circumferences of the punch and the counter punch. The upper and lower blank holders are respectively provided with a buffer mechanism. Friction material powders are sintered on both sides of the base sheet. The friction material layers are trimmed and planished by hot pressing. The base sheet with the friction material layers is fixed by the upper blank holder and the lower blank holder. A tooth profile with an absolute shear fractural surface is formed. The fixing indentation of the V-shaped structure of the friction material layers is cut off for obtaining a finished friction plate product with the friction material layers.

8 Claims, 2 Drawing Sheets

(58) Field of Classification Search
CPC ............... B21D 37/00–37/12; B22F 3/03;
F16D 13/64; F16D 2500/1045
USPC ... 72/333, 335, 336, 337, 338, 465.1, 466.8,
72/350, 351
See application file for complete search history.

(56) References Cited

U.S. PATENT DOCUMENTS

| | | | | | |
|---|---|---|---|---|---|
| 3,724,247 | A | * | 4/1973 | Page | B21D 37/00 |
| | | | | | 72/347 |
| 3,747,689 | A | * | 7/1973 | Frederick | E02D 13/04 |
| | | | | | 173/90 |
| 4,745,792 | A | * | 5/1988 | Story | B21D 22/22 |
| | | | | | 72/351 |
| 8,939,003 | B2 | * | 1/2015 | Schlatter | B21D 28/16 |
| | | | | | 72/332 |
| 2004/0129380 | A1 | * | 7/2004 | Murphy | B23P 21/006 |
| | | | | | 156/256 |
| 2006/0231369 | A1 | * | 10/2006 | Bassett | F16D 13/38 |
| | | | | | 192/107 M |
| 2008/0014036 | A1 | * | 1/2008 | Ueki | B21D 28/16 |
| | | | | | 409/1 |
| 2008/0168821 | A1 | * | 7/2008 | Chen | B21D 5/0209 |
| | | | | | 72/470 |
| 2013/0270059 | A1 | * | 10/2013 | Steinmetz | F16D 69/026 |
| | | | | | 192/107 M |
| 2019/0151926 | A1 | * | 5/2019 | Koopmans | H02K 15/02 |
| 2020/0009633 | A1 | * | 1/2020 | Lozano Bonet | B21D 43/28 |

\* cited by examiner

FINE BLANKING METHOD AND DEVICE FOR FORMING FRICTION PLATES WITH FRICTION MATERIAL LAYERS

CROSS-REFERENCE TO RELATED APPLICATIONS

This application claims the benefit of priority from Chinese Patent Application No. 202010281386.3, filed on Apr. 10, 2020. The content of the aforementioned application, including any intervening amendments thereto, is incorporated herein by reference in its entirety.

TECHNICAL FIELD

This application relates to a fine blanking technique for forming friction plates, and more particularly to a fine blanking method and device for forming a friction plate with friction material layers.

BACKGROUND OF THE DISCLOSURE

Fine blanking is an advanced method for producing friction plates with a high fatigue resistance. Before forming, the base sheet will be fixed by a strong three-dimensional compressive pressure by blank holders, a punch and a reverse punch. During the blanking process, the punch and counter punch move downward synchronously for cutting the base sheet. Due to the dynamic and strong three-dimensional pressure on the base sheet during the blanking process, almost an absolute sheer deformation will occur near the blanking sections. Therefore, a blanked surface with absolute shear fractural characteristics can be obtained on the base sheet. The blanking section has a high forming precision, a continuous and compact streamline and a low surface roughness. Furthermore, a residual compressive stress is generated near the blanking sections after the blanking, resulting in a significant promotion on the mechanical properties near the teeth of the friction plate.

SUMMARY OF THE DISCLOSURE

An object of the disclosure is to provide a fine blanking method and device for precision forming of a friction plate with friction material layers.

To achieve the object, the disclosure adopts the following technical solutions.

The disclosure provides a fine blanking device for forming a friction plate with friction material layers, comprising:
an upper die;
a lower die;
a guide mechanism;
wherein a punch is provided at the upper die, an upper blank holder is provided at an outer circumference of the punch; a counter punch is provided at the lower die, and a lower blank holder is provided at an outer circumference of the counter punch; the upper blank holder and the lower blank holder are respectively provided with a buffer mechanism; and during the fine blanking process, a vertical pressure is exerted on a base sheet by the upper blank holder and the lower blank holder for tightly fixing the base sheet, and at friction-material regions, the vertical pressure is transformed into a flexible pressure by the buffer mechanism. By the means of this, the base sheet can be tightly fixed, and meanwhile the friction material layers are protected.

In some embodiments, the buffer mechanism comprises ring grooves which are set at a bottom of the upper blank holder and a top of the lower blank holder, respectively, and a buffer layer provided in each of the ring grooves. During the fine blanking process, the buffer layer directly contacts a surface of the friction material layers on the base sheet; and initially, a sum of a thickness of the buffer layer and a thickness of the friction material layers is larger than a depth of the ring grooves.

In some embodiments, the depth of each of the ring grooves is 5-10 mm larger than the thickness of the buffer layer.

In some embodiments, a hydraulic piston is respectively provided in the ring grooves of the upper blank holder and the lower blank holder; the buffer layer is provided at an end surface of the hydraulic piston; during the fine blanking process, the buffer layer directly contacts the surface of the friction material layers of the base sheet.

In some embodiments, the upper blank holder and the lower blank holder each have a plane structure at an inner side of the buffer mechanism, and have a combination of V-shaped and plane structures at an outer side of the buffer mechanism.

In some embodiments, an edge of the V-shaped structure has an angle of 90°, and a distance between the edge of the V-shaped structure and an outer side of the friction material layers is 5-10 mm.

In some embodiments, the buffer layer is made of an elastic material.

Another object of the disclosure is to provide a fine blanking method for forming a friction plate with friction material layers using the above-mentioned device for improving the mechanical properties and service life of the friction plate.

The disclosure further provides a fine blanking method for forming a friction plate with friction material layers using the fine blanking device, comprising:

1) sintering friction material powders on both sides of the base sheet in a hot-pressing process for obtaining a multilayer sheet;

2) trimming the sintered friction material layers; and planishing the multilayer sheet by hot pressing;

3) tightly fixing the multilayer sheet by using the upper blank holder and the lower blank holder by exerting a vertical pressure, wherein at friction-material regions, the vertical pressure is transformed into a flexible pressure by the buffer mechanism so that the trimmed friction material layers are tightly fixed while being protected.

4) exerting a pre-compacting force on blanking regions of the multilayer sheet by the punch and the counter punch for applying a three-dimensional compressive stress; then enabling the upper die and the lower die to move downward synchronously to cut the multilayer sheet, so that a tooth profile with an absolute shear fractural surface is obtained;

5) cutting off a fixing indentation on the base sheet at an outer side of the friction material layers for obtaining a finished friction plate product with friction material layers.

The disclosure has the following beneficial effects.

The fine blanking device and method for forming friction plates are applicable to all kinds of friction plates with friction material layers on both sides. The base sheet can be made of all kinds of materials which are suitable for fine blanking. For instance, the base sheet of the friction plate can be made of kinds of steel materials like 65Mn and 30CrMnSiA. The tooth profile of the friction plate formed by the device and the method of this disclosure has a continuous and compact sectional streamline. The friction plate formed by the method of this disclosure has an excellent surface quality and mechanical properties that, a surface roughness of not more than 1.6 μm and a residual compressive stress of not less than 270 MPa. The device of this disclosure has a good stability, ensuring that the deformation can only occur near the shear fractural surface. By using a multistage blank holder (plane at the inner side and a V-shaped edge at the outer side of the friction material layer), the multilayer can be tightly fixed, and therefore the warping deformation of the sheet can be avoided. Meanwhile, by setting a buffer mechanism in the groove of the blank holders which is corresponding to the friction-material layers, the fixing pressure can be transformed into a flexible pressure for protecting. Thus, the strain of the friction material layer can be controlled within 0.01, ensuring that almost no microcrack can be detected. Furthermore, the interlamellar bonding interface between the friction material layers and the base sheet has a comfortable shear strength that is not less than one third of the shear strength of the base sheet.

DETAILED DESCRIPTION OF EMBODIMENTS

The invention will be further described with reference to the embodiments and the accompanying drawings. However, the embodiments herein are merely illustrative of the invention, and are not intended to limit the invention. It should be noted that various modifications of the invention made by those skilled in the art without departing from the spirit and scope of the invention should fall within the scope of the invention.

Example 1

Figure 1:
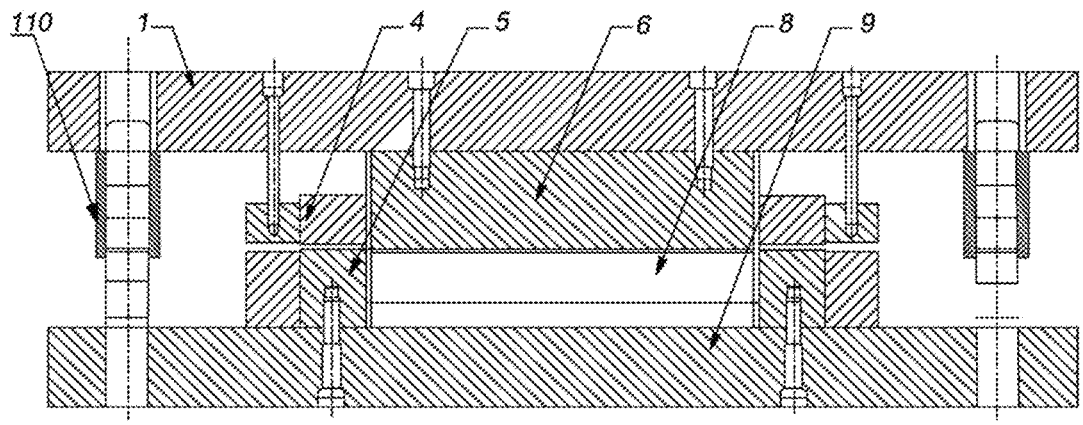
FIG. 1 is a schematic diagram of a fine blanking device according to Embodiment 1 of the present disclosure.
Figure 2:
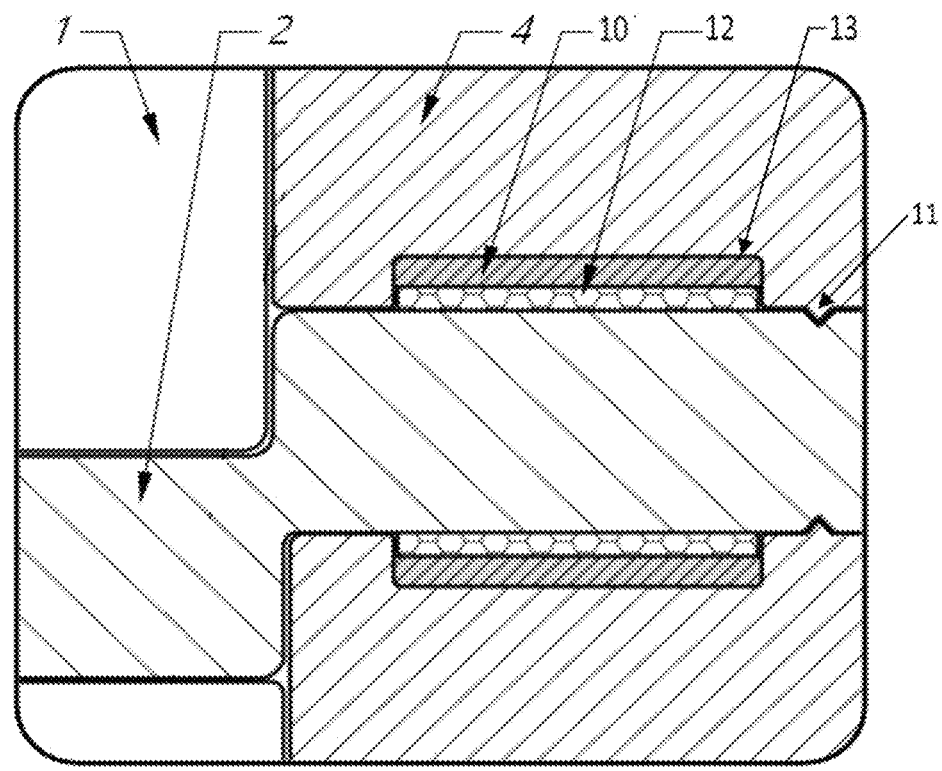
FIG. 2 schematically shows a buffer mechanism of the fine blanking device according to Embodiment 1 of the present disclosure.

As shown in FIGS. 1 and 2, this embodiment provides a fine blanking device for precision forming of a friction plate with friction material layers, including: an upper die 1; a lower die 9; and a guide mechanism 110. A punch 6 is provided at the upper die, and an upper blank holder 4 is provided at an outer circumference of the blanking punch 6. A counter punch 8 is provided at the lower die, and a lower blank holder 5 is provided at an outer circumference of the counter punch 8. The upper blank holder 4 and the lower blank holder 5 are respectively provided with a buffer mechanism 120. The buffer mechanism 120 includes ring grooves 13 which are respectively provided at a bottom of the upper blank holder 4 and a top of the lower blank holder 5, and a buffer layer 10 provided in each of the ring grooves 13. During the fine blanking process, the buffer layer 10 directly contacts a surface of friction material layers 12 of a base sheet 2 to apply a vertical flexible pressure to the friction material layers 12 of the base sheet 2. Initially, a sum of the thicknesses of the buffer layer 10 and the friction material layers 12 is larger than a depth of the ring grooves 13.

In this embodiment, diameters of the punch 6 and the counter punch 8 are 260 mm, edges of the punch 6 and the counter punch 8 respectively have a rounded corner with a length of 0.5 mm. The depth of the ring grooves 13 is 8 mm.

In some embodiments, the buffer layer 10 is made of an elastic material and has a thickness of 7 mm. The upper blank holder and the lower blank holder each have a plane structure at an inner side of the buffer mechanism 120, and have a combination of V-shaped and plane structures at an outer side of the buffer mechanism 120. This structure improves the stability of the fine blanking and the precision of the friction plate. A distance between an edge 11 of the V-shaped structure and an outer side of the friction material layers 12 is 5 mm. The edge 11 of the V-shaped structure has an angle of 90°, and a length of 2 mm. The upper blank holder 4 and the lower blank holder 5 each have an outer diameter of 400 mm, an inner diameter of 260.3 mm, and inner edge of the upper blank holder 4 and the lower blank holder 5 each have an arc angling of 0.5 mm. After the assembly, a blanking clearance between the punch 6 and the upper blank holder 4 is 0.3 mm, and a blanking clearance between the counter punch 8 and the lower blank holder 5 is 0.3 mm.

This embodiment further provides a fine blanking method for forming a friction plate using the above-mentioned device, including the following steps.

1) Friction material powders are sintered on both sides of the base sheet 2 in a hot-pressing process for obtaining a multilayer sheet. Specifically, a circular 30CrMnSiA base sheet with a diameter of 350 mm and a thickness of 6 mm is prepared by a shear machine. Copper powders are grinded in a ball mill for 20 min. A material of the friction material layers is prepared by uniformly mixing 65 g copper powders and 35 g phenolic resin. The circular 30CrMnSiA base sheet and the friction material layer material are heated to 800° C. in a vacuum hot press sintering furnace. The material of the friction material layers is sintered for 3 h under high temperature, a high pressure of 50 MPa and a shielding gas. Then the vacuum hot press sintering furnace is cooled to 600° C. and keeps the state for 1.5 h, so that the material of the friction material layers is tightly sintered at both sides of the circular 30CrMnSiA base sheet. After the vacuum hot press sintering furnace is cooled to room temperature, the circular 30CrMnSiA base sheet is taken out.

2) The sintered friction material layers 12 are trimmed, and the multilayer sheet is planished by hot pressing to obtain a flat and uniform multilayer sheet. The friction plate 12 has a thickness of 3 mm, an inner diameter of 305 mm and an outer diameter of 340 mm.

3) The base sheet 2 with the friction material layers 12 is tightly fixed by using the upper blank holder 4 and the lower blank holder 5 by exerting a vertical pressure. At friction-material regions, the vertical pressure is transformed into a flexible pressure by the buffer mechanism 120, so that the trimmed friction material layers are tightly fixed while being protected. Specifically, the multilayer sheet is transferred between the upper blank holder 4 and the lower blank holder 5, and is fixed by a blank pressing force of 120 MPa from the upper blank holder 4 and the lower blank holder 5. At the same time, the friction material layers 12 are just embedded in the ring grooves 13 and pressed on the buffer layer 10. After the buffer layer 10 is pressed, the flexible pressure is applied on the friction material layers 12.

4) A pre-compacting force is exerted on blanking regions of the multilayer sheet by the punch 6 and the counter punch 8 for applying a three-dimensional compressive stress. The upper die and the lower die move downward simultaneously to cut the multilayer sheet, so that a tooth profile with an absolute shear fractural surface is obtained, where after treated by prepressurization at 120 MPa, the punch 6 and the counter punch 8 move at a speed of 2 mm/s to shear the base sheet 2 so as to form a complete tooth profile of the friction material plate.

Figure 4:
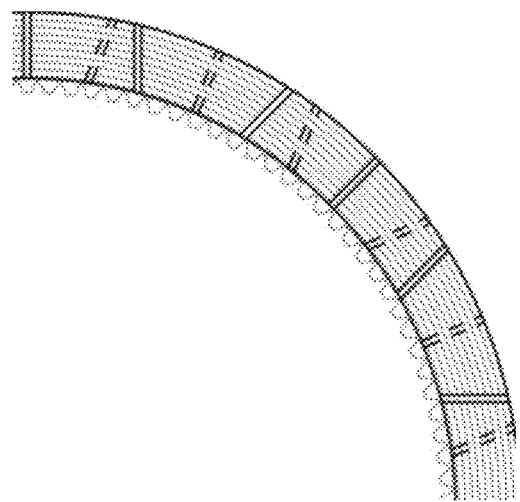
FIG. 4 is a schematic diagram of the friction plate by fine blanking according to the present disclosure.

5) As shown in FIG. 4, a fixing indentation on the base sheet at an outer side of the friction material layers for obtaining a finished friction plate product with friction material layers 12.

After detection, a surface of the tooth profile of the friction material plate formed by the device and the method of this embodiment has a residual compressive stress of not less than 270 MPa, a continuous and compact sectional streamline and a surface roughness of not more than 1.6 µm. In addition, the friction material layers 12 are intact.

Example 2

Differences between the fine blanking device of this embodiment and that of Embodiment 1 are described as follows.

In this embodiment, diameters of the punch 6 and the counter punch 8 are 290 mm, edges of the punch 6 and the counter punch 8 respectively have a rounded corner having a length of 0.5 mm. The depth of the ring groove 13 is 7 mm. The buffer layer 10 is made of an elastic material and has a thickness of 6 mm. The upper blank holder and the lower blank holder each have a plane structure at an inner side of the buffer mechanism 120, and have a combination of V-shaped and plane structures at an outer side of the buffer mechanism 120. This structure improves the stability of the fine blanking and the precision of the friction plate. A distance between an edge 11 of the V-shaped structure and an outer side of the friction material layer 12 is 8 mm. The edge 11 of the V-shaped structure has an angle of 90°, and a length of 3 mm. The upper blank holder 4 and the lower blank holder 5 have outer diameters of 450 mm, inner diameters of 290.5 mm and inner edges with an arc angling of 0.5 mm. After the assembly, a blanking clearance between the punch 6 and the upper blank holder 4 is 0.5 mm, and a blanking clearance between the counter punch 8 and the lower blank holder 5 is 0.5 mm.

This embodiment further provides a fine blanking method for forming a friction plate with friction material layers using the above-mentioned device, including the following steps.

1) Friction material powders are sintered on both sides of the base sheet 2 for obtaining a multilayer sheet. Specifically, a circular 30CrMnSiA base sheet with a diameter of 350 mm and a thickness of 6 mm is formed by a shear machine. Copper powders are grinded in a ball mill for 20 min. The material of the friction material layers is prepared by uniformly mixing 65 g copper powders and 35 g phenolic resin. The circular 30CrMnSiA base sheet and the material of the friction material layers are heated to 800° C. in a vacuum hot press sintering furnace. The material of the friction material layers is sintered for 3 h under high temperature, a high pressure of 50 MPa and a shielding gas. Then the vacuum hot press sintering furnace is cooled to 600° C. and keeps the state for 1.5 h, so that material of the friction material layer is tightly sintered at both sides of the circular 30CrMnSiA base sheet. After the vacuum hot press sintering furnace is cooled to room temperature, the circular 30CrMnSiA base sheet is taken out.

2) The sintered friction material layers 12 are trimmed, and the multilayer sheet is planished by hot pressing to obtain a flat and uniform multilayer sheet 12. The friction plate 12 has a thickness of 2 mm, an inner diameter of 270 mm and an outer diameter of 300 mm.

3) The multilayer sheet is tightly fixed by using the upper blank holder 4 and the lower blank holder 5 by exerting a vertical pressure. At friction-material regions, the vertical pressure is transformed into a flexible pressure by the buffer mechanism 120, so that the trimmed friction material layers are tightly fixed while being protected. Specifically, multilayer sheet is transferred between the upper blank holder 4 and the lower blank holder 5, and is fixed by a blank holder force of 120 MPa from the upper blank holder 4 and the lower blank holder 5. At the same time, the friction material layers 12 are just embedded in the ring grooves 13 and pressed on the buffer layer 10. After the buffer layer 10 is pressed, the flexible pressure is applied on the friction material layers 12.

4) A pre-compacting force is exerted onto blanking regions of the multilayer sheet by the punch 6 and the counter punch 8 for applying a three-dimensional compressive stress. The upper die and the lower die move downward simultaneously to form a tooth profile with an absolute shear fractural surface, where after treated by prepressurization at 120 MPa, the punch 6 and the counter punch 8 move at the same speed of 2 mm/s to shear the base sheet 2 to form a complete tooth profile of the friction plate.

5) As shown in FIG. 4, a fixing indentation on the base sheet at an outer side of the friction material layers 12 is cut off for obtaining a finished friction plate product with friction material layer 12.

After detection, the surface of the tooth profile of the friction plate formed by the device and the method of this embodiment has a residual compressive stress of not less than 270 MPa, a continuous and compact sectional streamline and a surface roughness of not more than 1.6 µm. In addition, the friction material layers 12 are intact.

Example 3

Figure 3:
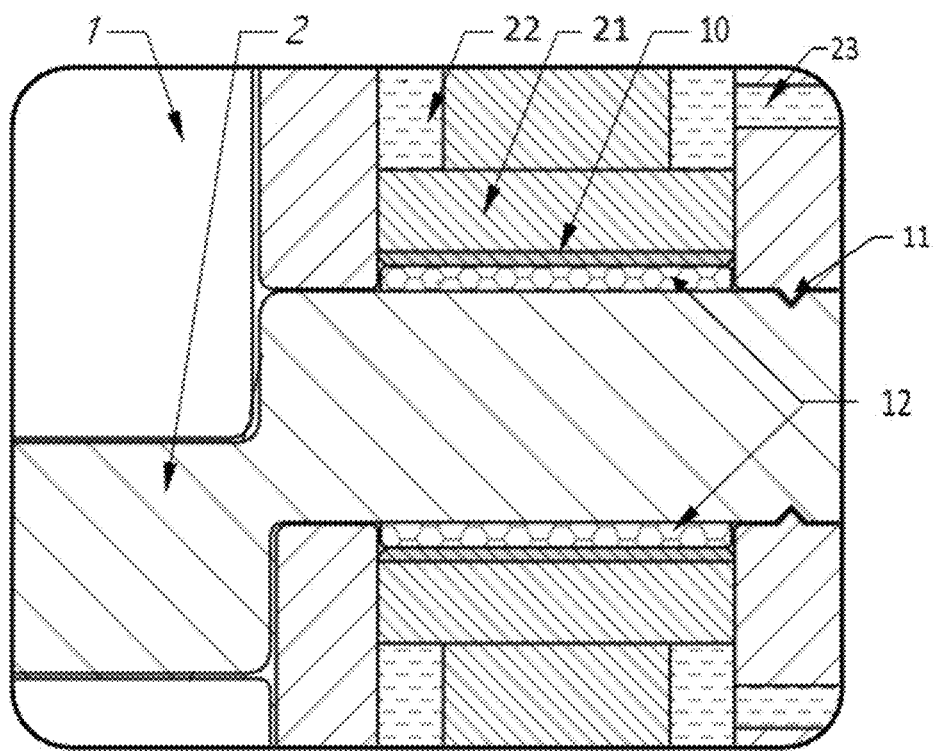
FIG. 3 schematically shows the buffer mechanism of the fine blanking device according to Embodiment 3 of the present disclosure.

As shown in FIGS. 1 and 3, this embodiment provides a fine blanking device, including: an upper die 1, a lower die 9, and a guide mechanism 110; a punch 6 is provided at the upper die 1, and an upper blank holder 4 is provided at an outer circumference of the punch 6. A counter punch 8 is provided at the lower die, and a lower blank holder 5 is provided at an outer circumference of the counter punch 8. The upper blank holder 4 and the lower blank holder 5 are respectively provided with a buffer mechanism 120. A hydraulic piston 21 is respectively provided on the upper blank holder 4 and the lower blank holder 5. A buffer layer 10 is provided at an end surface of the hydraulic piston 21. In the fine blanking process, the buffer layer 10 is driven by a hydraulic oil 22 entering from an oil inlet 23 to move down to directly touch a surface of the friction material layer 12 of the base sheet 2 to apply a flexible pressure to the friction material layers 12 of the base sheet 2.

In this embodiment, diameters of the punch 6 and the counter punch 8 each are 310 mm, edges of the punch 6 and the counter punch 8 respectively have a rounded corner of 0.5 mm. In some embodiments, a ring groove 13 has a depth which is 5-10 mm larger than the thickness of the friction material layers 12. Specifically, the depth of the ring groove 13 is 12 mm. A hydraulic cushion having a thickness of 6 mm is used as the buffer layer 10. In some embodiments, when the hydraulic piston 21 is retracted to a limit position, a pit with a depth of 3 mm is formed on a surface of the buffer layer 10. The upper blank holder and the lower blank holder each have a plane structure at an inner side of the buffer mechanism 120, and have a combination of V-shaped and plane structures at an outer side of the buffer mechanism 120. This structure improves the stability of the fine blanking device and the forming precision of the friction plate. A distance between an edge 11 of the V-shaped structure and an outer side of the friction material layers 12 is 10 mm. The edge 11 of the V-shaped structure has an angle of 90°, and a length of 2 mm. The upper blank holder 4 and the lower blank holder 5 have outer diameters of 480 mm, inner diameters of 310.5 mm and inner edges with an arc angling of 0.5 mm. After the assembly, a blanking clearance between the punch 6 and the upper blank holder 4 is 0.5 mm, and a blanking clearance between the counter punch 8 and the lower blank holder 5 is 0.5 mm.

This embodiment further provides a fine blanking method for forming a friction plate with friction material layers using the above-mentioned device, including the following steps.

1) Prepared friction material powders are sintered on both sides of the base sheet 2 for obtaining a multilayer sheet. Specifically, a circular 30CrMnSiA base sheet with a diameter of 400 mm and a thickness of 7 mm is formed by a shear machine. A material of the friction material layers is prepared by grinding a resin adhesive, a friction regulator and a strengthened short asbestos fiber in a ball mill for 20 min and uniformly mixing them. The circular 30CrMnSiA base sheet and the material of the friction material layers are heated to 400-500° C. in a vacuum hot press sintering furnace. The material of the friction material layers is sintered for 4 h under high temperature and a high pressure of 150 MPa, so that the friction material layer material is tightly sintered at both sides of the circular 30CrMnSiA base sheet. After the vacuum hot press sintering furnace is cooled to room temperature, the circular 30CrMnSiA base sheet is taken out.

2) The sintered friction material layers 12 are trimmed, and the multilayer sheet is planished by hot pressing to obtain a flat and uniform multilayer sheet 12. The friction plate 12 has a thickness of 2 mm, an inner diameter of 320 mm and an outer diameter of 370 mm.

3) The multilayer sheet is tightly fixed by using the upper blank holder 4 and the lower blank holder 5 by exerting a vertical pressure. At friction-material regions, the vertical pressure is transformed into a flexible pressure by the buffer mechanism 120. Specifically, the multilayer sheet is transferred between the upper blank holder 4 and the lower blank holder 5, and is fixed by a force of 150 MPa from the upper blank holder 4 and the lower blank holder 5. At the same time, the friction material layers 12 are just embedded in the ring grooves 13 and pressed on the hydraulic cushion. After the hydraulic cushion is pressed, the flexible pressure is applied on the friction material layer 12.

4) A pre-compacting force is exerted on blanking regions of the multilayer sheet by the punch 6 and the counter punch 8 for applying a three-dimensional compressive stress. The upper die and the lower die move downward synchronously to cut the multilayer sheet, so that a tooth profile with an absolute shear fractural surface is obtained, where after treated by prepressurization at 100 MPa, the punch 6 and the counter lunch 8 move at a speed of 1 mm/s to shear the base sheet 2 to form a complete tooth profile of the friction plate.

5) As shown in FIG. 4, a fixing indentation on the base sheet at an outer side of the friction material layers 12 is cut off for obtaining a finished friction plate product with the friction material layers 12.

After detection, a surface of the tooth profile of the friction plate formed by the device and the method of this embodiment has a residual compressive stress of not less than 270 MPa, a continuous and compact sectional streamline and a surface roughness of not more than 1.6 μm. The friction material layers 12 are intact.

An industrial CT imaging technique is used to detect internal defects of the friction material layers of the friction plates prepared in Embodiments 1-3, respectively. The results show that there is not obvious microcrack in each friction material layer.

A high-precision three-dimensional scanner is used to measure the dimensional precisions of the friction material layers of the friction plates prepared in Embodiments 1-3, respectively. The results show that the strain of the friction material layer can be controlled within 1%.

A universal mechanical testing machine is used to test interlamellar shear strengths of the friction material layers of the friction plates formed in Embodiments 1-3, respectively. To operate the test, a test friction material layer is divided to two interlamellar areas. The two interlamellar areas are stretched in opposite directions. The load-displacement curve is recorded. The shear strength is the maximum load divided by the interlamellar fitting area. The results show that the interlamellar bonding interface between the friction material layers and the base sheet of the friction plate has a comfortable shear strength that is not less than one third of the shear strength of the base sheet itself, respectively.

What is claimed is:

1. A fine blanking device for forming a friction plate with friction material layers, comprising:
   an upper die;
   a lower die; and
   a guide mechanism;
   wherein a punch is provided at the upper die, and an upper blank holder is provided at an outer circumference of the punch; a counter punch is provided at the lower die, and a lower blank holder is provided at an outer circumference of the counter punch; a bottom of the upper blank holder and a top of the lower blank holder are respectively recessed to form a ring groove; a buffer layer is provided inside the ring groove; a depth of the ring groove is larger than a thickness of the buffer layer; and during a fine blanking process, a vertical pressure is exerted on a base sheet by the upper blank holder and the lower blank holder for tightly fixing the base sheet, and at friction material layers of the base sheet, the vertical pressure is transformed into a flexible pressure by the buffer layer; and
   the buffer layer is configured to contact a surface of the friction material layers of the base sheet during the fine blanking process; and the ring groove is configured to act as a shelter of the friction material layers.

2. The fine blanking device of claim 1, wherein a sum of the thickness of the buffer layer and thickness of the friction material layers before the fine blanking process is larger than the depth of the ring groove.

3. The fine blanking device of claim 2, wherein the depth of the ring groove is 5-10 mm larger than the thickness of the buffer layer.

4. The fine blanking device of claim 1, wherein a hydraulic piston is provided between the buffer layer and an end surface of the ring groove opposite to the base sheet.

5. The fine blanking device of claim 1, wherein the upper blank holder and the lower blank holder each have a plane structure at an inner side of the ring groove, and have a combination of V-shaped and plane structures at an outer side of the ring groove.

6. The fine blanking device of claim 5, wherein an edge of the V-shaped structure has an angle of 90°, and a distance between the edge of the V-shaped structure and an outer side of the friction material layer is 5-10 mm.

7. The fine blanking device of claim 6, wherein the buffer layer is made of an elastic material.

8. A fine blanking method for forming a friction plate using the fine blanking device of claim 1, comprising:
 1) Sintering friction material powders on both sides of the base sheet in a hot-pressing process for obtaining a multilayer sheet;
 2) Trimming the sintered friction material layers; and planishing the multilayer sheet by hot pressing;
 3) Tightly fixing multilayer sheet by the upper blank holder and the lower blank holder by exerting a vertical pressure; wherein at friction-material regions, the vertical pressure is transformed into a flexible pressure by the buffer layer, so that the trimmed friction material layers are tightly fixed while being protected;
 4) Exerting a pre-compacting force on blanking regions of the multilayer sheet by the punch and the counter punch for applying a three-dimensional compressive stress; and enabling the upper die and the lower die to move downward synchronously to cut multilayer sheet, so that a tooth profile with an absolute shear fractural surface is formed; and
 5) Cutting off a fixing indentation on the base sheet at an outer side of the friction material layers for obtaining a finished friction plate product with friction material layers.

* * * * *